United States Patent Office 3,301,815
Patented Jan. 31, 1967

3,301,815
STABILIZATION OF VINYL RESINS WITH ORGANIC QUATERNARY AMMONIUM NITRATES
Csaba K. Hunyar, 1043 N. Sierra Bonita, Los Angeles Calif. 90046, and Karl J. Balog, 767 N. Kenmore Ave., Los Angeles, Calif. 90029
No Drawing. Filed Apr. 19, 1962, Ser. No. 188,869
9 Claims. (Cl. 260—45.9)

This invention has to do generally with improving the properties of thermoplastic resins subject to physical processing for the purpose of developing or forming useful objects. More specifically, the invention is directed to eliminating or reducing certain deficiencies associated with or resulting from heat or fusion processing of vinyl type polymerization thermoplastic resins.

Vinyl type polymerization thermoplastic resins containing halogens, acetic groups, hydroxyl groups and the like such as polyvinylchloride, polyvinylacetate, polyvinyl alcohol, vinylidene chloride, and polyvinylfluoride, are generally processed by the application of heat according to various methods. Such materials when exposed to heat treatment, are subject to heat decomposition producing both visible and invisible effects. Visible effects include blistering, gas evolution, color change to darker shades and usually so-called burning where decomposition continues to the extent of almost complete charring. Invisible effects include decrease in desirable physical properties, and also changes in electrical properties.

Chemically, the heat decomposition starts with a splitting off of halogenic acid and/or acetic molecules from the vinyl polymer chain, producing double bonds. The double bond is chromophor producing and is responsible for the color change as the carrier of the coloring effect. The evolved halogenic acid creates gaseous bubbles and blisters in the material and at processing temperatures changes the original size of the material. These ionized products also destroy desired electrical properties, and the evolved halogenic (and/or other) acids act as further catalysts for the decomposition which proceeds with increasing speed.

To prevent the aforementioned very harmful degradation of vinyl type materials, additives or so called stabilizers are used with different effects and purposes, mainly to prevent the decomposition for as long as possible, and to prolong the useful life of the compounds at elevated temperatures during heat processing. Such stabilizers cannot prevent the initial heat splitting, but react with the double bond eliminating the chromophor groups, and also react with the evolved halogenic acid eliminating it as decomposition catalyst. Some additives such as salts of fatty acids, naphthenic acid and the like are designated as primary stabilizers. Secondary stabilizers, as for example epoxide compositions, are used as boosters for the primary stabilizers, but are not themselves effective to significant degree. These materials are usually noncompatible with the vinyl compound, there being a tendency for the so called undesirable "plate-out" effect to occur. Also some vinyl type compositions do not permit the use of such stabilizers.

The present invention relates to a method for stabilizing vinyl resins especially against blistering and gaseous decomposition and blistering upon exposure to elevated processing temperatures. All resins employed are of vinyl type and typically include polymers of vinyl halogenides (polyvinylchloride, bromide or fluoride), polyvinylacetates, vinylidenechloride and halogenides, also the copolymers of the above-mentioned resins. More particularly, a major purpose of the invention is to provide for improved stabilization of vinyl type resins, through the use of a class of stabilizing agents producing superior stability against gaseous decomposition and also being compatible with desired color development.

I have found that nitrate anion containing quaternary ammonium products of different chain length fatty acid derivatives are useful stabilizers providing some additional features. The compound has the following general formula

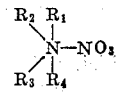

where $R_1$, $R_2$, $R_3$, $R_4$ are alkyl and/or aryl organic groups. Typical of these R alkyl groups are the following:

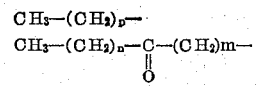

where $n$ and $m$ are even integers between 0 and 14 and the sum of $n$ and $m$ is at least 4, and $p$ is an even integer between 6 and 14, and typical of the R aryl groups are the following:

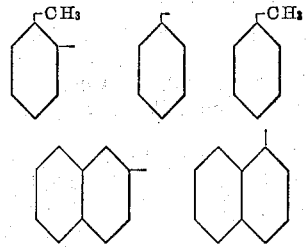

Typical stabilizer compounds are as follows:

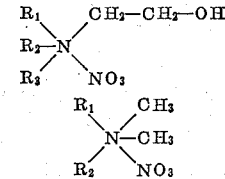

Typical ester and ether type linkage compounds are:

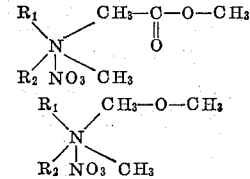

Any of these groups can be a short (less than 6 carbon atoms) or long (6 or more carbon atoms) chain length group, and the group ends may be $CH_3$, or $CH_2$—OH or have ester or ether linkages. It is important that the anionic group be nitrate.

An important factor to be considered in the processing of vinyl type polymers, namely their lubricity, is controlled through chain length control, higher chain length yielding higher lubricity. The lubricity is easily controlled if only one of the four R groups is a long chain type. If two or more of these groups are long chain types, the lubricity becomes less controllable and usually too high. Compounds with two long chain groups can be considered in practical use, but three long chain groups are impractical. Also, if the chain ends with $CH_3$ groups, the lubricity is the highest, a $CH_2$—OH group end giving lesser lubricity. Ester endings give the material plasticizing effect, which is sometimes undesirable, but can be used in certain compositions.

While some stabilizing effect will be found to result over a relatively wide range of proportions, for most applications the stabilizer additions are made in ranges of 0.5% to 2% by weight of the stabilized resin product; the desired amount depending not only upon stabilizer used but also on the type of vinyl material used and its properties.

The vinylhalogenide resin (usually vinylchloride resin) used in conjunction with this invention is not only the basic resins and its copolymers, but other copolymers whose parts are compatible with the basic resin as for example copolymers with vinylacetate and other vinyl esters of monocarboxylic acids, alkyl esters of maleic and fumaric acids, alkyl esters of acrylic and methacrylic acids.

The method of stabilizing the aforementioned vinyl type resins requires only the physical addition and thorough incorporation of the stabilizer into the resin. Because most of the mentioned stabilizer compounds are heavy liquids, liquid-solid mixing technology may be used. In practical applications the stabilizer is added to the vinyl resin powder before heat processing in a powder blender. If the liquid is too viscous, a small amount of solvent helps the even distribution. Any fast evaporating compatible solvent may be used, such as alcohols, ketones like acetone, or benzene. If stabilizer is used in plasticized compounds, it is advantageous to blend the stabilizer and the plasticizer together first, and thereafter blend with the vinyl powder. Some high chain length stabilizers are waxlike solids, and then a pulverizing and powder blending is employed. The resins may be compounded with use of the conventional heat processing equipment such as roll mills, Banbury mixer, extruder, and the like.

In the following examples the vinyltype thermoplastic material is a polyvinylchloride resin or polyvinylchloride-acetate copolymer, without the addition of stabilizer other than that mentioned. The examples 2–5 will illustrate specific embodiments of the invention without limiting it to the details shown.

*Example 1.—(control)*

A vinylchloride-acetate copolymer of 85% by weight of vinylchloride and 15% vinyl acetate was placed in powder form between two metal sheets, and by preheating at 350° F. for 30 seconds pressed with about 2000 p.s.i. to a transparent sheet. The material could not be milled on roll mills without burning. This sheet was used for further control as a non-stabilized material for comparison with the following experimental examples:

*Example 2*

The same vinylpowder as used in Example 1 was dry blended with 1% by weight stabilizer of the following formula:

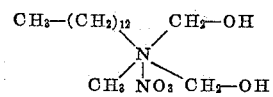

The material was milled on roll mills, surface temperature 310° F., roll speed 40/44, roll ratio 1:1.1, for 4.5 minutes, and sheeted. The sheets were heat tested against the control sheet (Example 1) in an oven at 135° C. for 90 minutes. The control was seriously blistered in a relatively short time, whereas the stabilized compound had a much longer life time. The initial discoloration was not objectionable.

*Example 3*

Pure polyvinylchloride powder was dry blended with 2% of the Example 2 stabilizer, roll milled, sheeted and tested with the same method. For controls, both the material of Example 1, and also sheet produced from pure non-stabilized polyvinylchloride powder were used. Heat tests at 135° C. and 150° C. showed a superior heat stability for the stabilized compound, especially against blistering.

*Example 4*

The same materials and test conditions as in Example 2 were used, 1% stibilizer had the following formula:

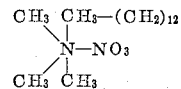

Results were the same as in Example 2 but the stabilized material showed slightly higher lubricity. The same better heat stability was observed in the heat stibility test.

*Example 5*

The same materials and test conditions as in Example 2 were used, but the 1% stabilizer had the formula:

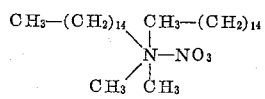

The stabilized vinyl compound was highly lubricant and was somewhat difficult to roll, but was not overlubricated for Banbury mixers. Heat stability test was good as compared with the control material of Example 1.

The Examples 2–5 compounds were characterized as being highly antistatic so as to repel dust.

Obviously many modifications and variations in the processes stabilizers and compositions described above may be made without departing from the spirit and scope of the invention as defined in the appended claims.

We claim:

1. In the process for stabilizing a vinyl thermoplastic resin against blistering and gaseous decomposition upon exposure to elevated temperatures, said resin being of the class consisting of polymers and copolymers of vinyl halogenides, vinylacetates, and vinylidenehalogenides, the steps that include adding to the vinyl resin a stabilizing amount of a compound having the formula

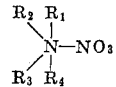

where $R_1$, $R_2$, $R_3$ and $R_4$ are organic groups selected from the class consisting of alkyl and aryl groups, and intimately blending the vinyl resin and said compound.

2. In the process for stabilizing a vinyl thermoplastic resin against blistering and gaseous decomposition upon exposure to elevated temperatures, said resin being of the class consisting of polymers and copolymers of vinyl halogenides, vinylacetates, and vinylidenehalogenides, the steps that include adding to the vinyl resin a stabilizing amount of compound having the formula

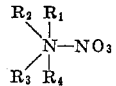

where $R_1$, $R_2$, $R_3$ and $R_4$ are organic groups selected from the class consisting of alkyl and aryl groups, the resin and said compound being in flowable state, and intimately blending the resin and said compound.

3. The process of claim 2 in which the amount of said compound lies within the range 0.2 to 2% by weight of the mix.

4. The process of claim 2 in which at least one R organic group in said formula contains at least 6 carbon atoms, and at least two organic groups in said formula contain less than 6 carbon atoms.

5. The process of claim 4 in which said one organic group containing at least 6 carbon atoms has an organic group ending consisting of $CH_3$.

6. The process of claim 4 in which said R organic group or groups in said formula containing at least 6 carbon atoms are selected from the following organic groups:

(a) $CH_3-(CH_2)_p-$ (b) $CH_3-(CH_2)_n-\underset{\underset{O}{\|}}{C}-(CH_2)_m-$ (c) 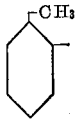

(d) 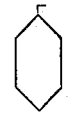

(e) 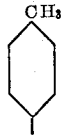

(f) 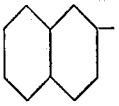

(g) 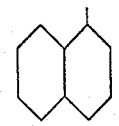

where $n$ and $m$ are even integers between 0 and 14 and the sum of $n$ and $m$ is at least 4, and $p$ is an even integer between 6 and 14.

7. The process of claim 4 in which an R organic group in said formula containing less than 6 carbon atoms is selected from the following organic groups:

(a) $-CH_2-CH_2-OH$ (b) $-CH_3$ (c) $-CH_2-\underset{\underset{O}{\|}}{C}-O-CH_3$ (d) $-CH_2-O-CH_3$ (e) $-CH_2-OH$ 8. The process of claim 2 in which the admixed resin and stabilizer are subjected to heat treatment and forming.

9. The product obtained by the process of claim 2.

References Cited by the Examiner

UNITED STATES PATENTS

| | | | |
|---|---|---|---|
| 2,234,203 | 3/1941 | Starkweather et al. | 260—45.9 |
| 2,321,517 | 6/1943 | Rosen et al. | 252—401 |
| 2,491,444 | 12/1949 | Cox et al. | 260—45.9 |
| 2,626,877 | 1/1953 | Carnes | 260—45.9 |
| 2,676,987 | 4/1954 | Lewis et al. | 260—567.6 |
| 2,700,683 | 1/1955 | Tesoro et al. | 260—567.6 |

FOREIGN PATENTS 720,023  12/1954  Great Britain.

LEON J. BERCOVITZ, *Primary Examiner.*

JOSEPH R. LIBERMAN, H. E. TAYLOR,
*Assistant Examiners.*